July 22, 1952 L. W. MONROE 2,604,522
OVERFLOW INDICATOR
Filed July 30, 1947 3 Sheets-Sheet 1
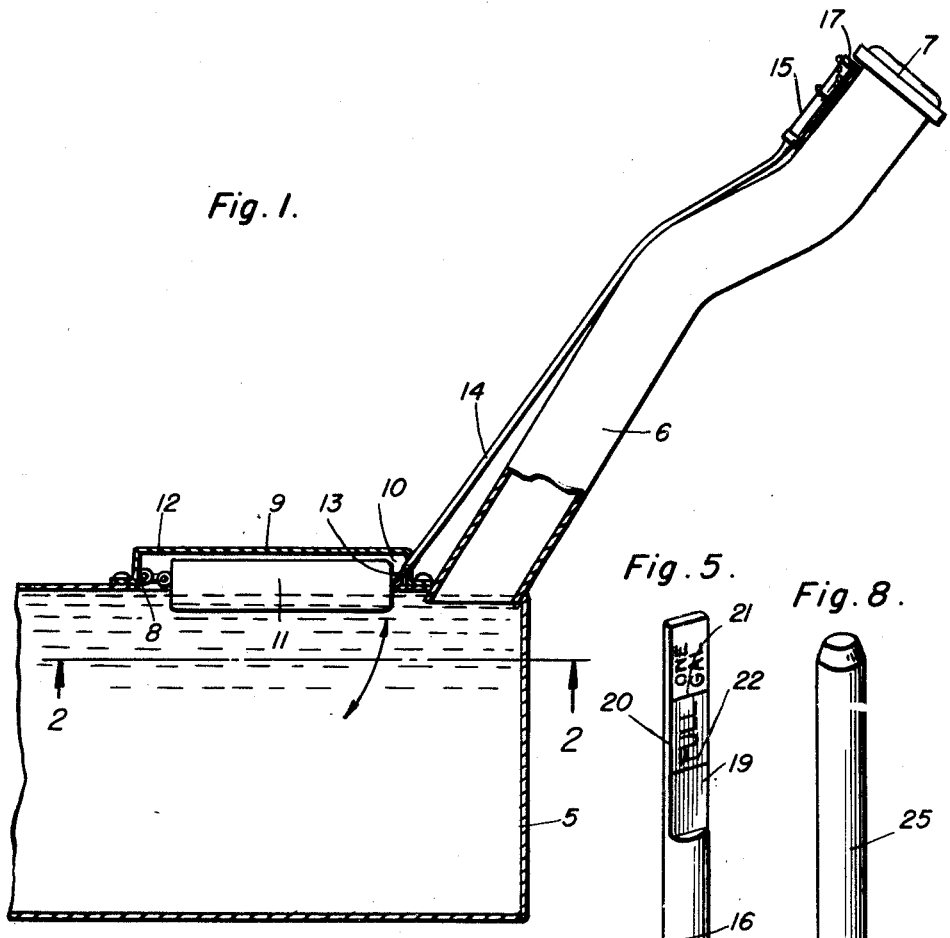
Inventor
Lawrence W. Monroe
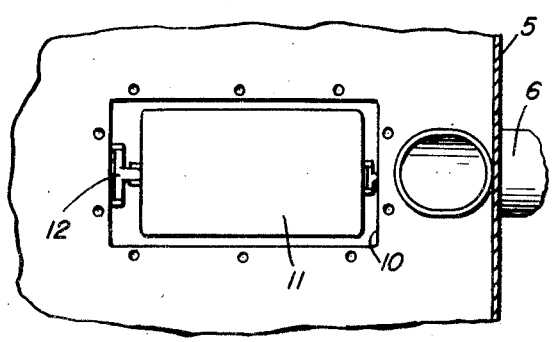
Attorneys

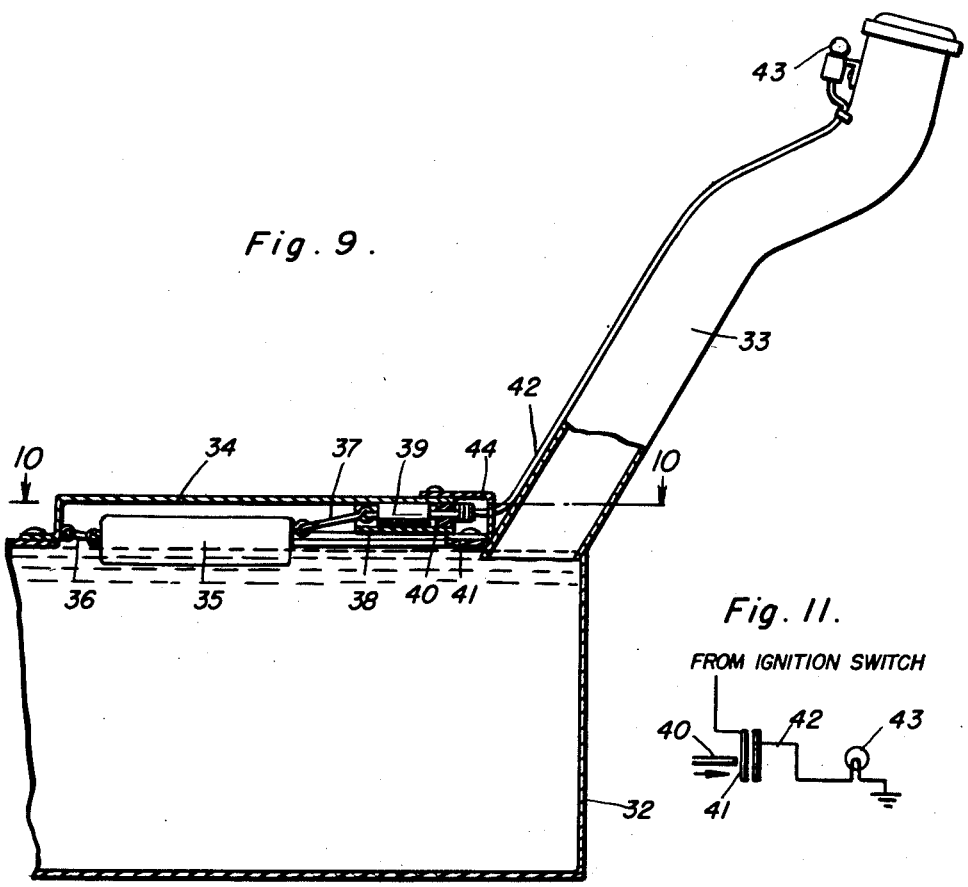

July 22, 1952

L. W. MONROE 2,604,522

OVERFLOW INDICATOR

Filed July 30, 1947

Inventor

Lawrence W. Monroe

By Lawrence A. O'Brien
and Harvey B. Jacobson
Attorneys

Patented July 22, 1952

2,604,522

UNITED STATES PATENT OFFICE 2,604,522

OVERFLOW INDICATOR

Lawrence W. Monroe, Long Beach, Calif.

Application July 30, 1947, Serial No. 764,771

4 Claims. (Cl. 177—311)

The present invention relates to new and useful improvements in indicators for closed tanks or other container to indicate the approach of liquid supplied to the tank to the capacity thereof and thus prevent the overflow and waste of the liquid which would otherwise occur.

An important object of the present invention is to provide an overflow indicator designed particularly for use with the gas tank of an automobile or other motor-driven vehicle and includes the provision of a conspicuous indicator to show the filling attendant when the filling of a tank approaches its capacity and thus avoid the overflowing of the tank with the hazards incident thereto.

A further object of the invention is to provide an indicator of this character which is attached directly to the neck of a gasoline tank whereby the attendant may readily observe the action of the indicator.

A still further object of the invention is to provide a device of this character of simple and practical construction, which is efficient and reliable in opeartion, relatively inexpensive to manufacture, easy to install in operative position on a gas tank and which otherwise is well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a fragmentary side elevational view of a gas tank with parts broken away and shown in section;

Figure 2 is a sectional view taken on a line 2—2 of Figure 1;

Figure 5 is a perspective view of the graduated indicator;

Figure 8 is a perspective view of the plunger therefor;

Figure 9 is a fragmentary sectional view of a tank illustrating a further modified construction;

Figure 10 is a sectional view taken on a line 10—10 of Figure 9; and

Figure 11 is a diagram of the electric circuit for the signalling lamp of the invention shown in Figure 9.

Figure 3:
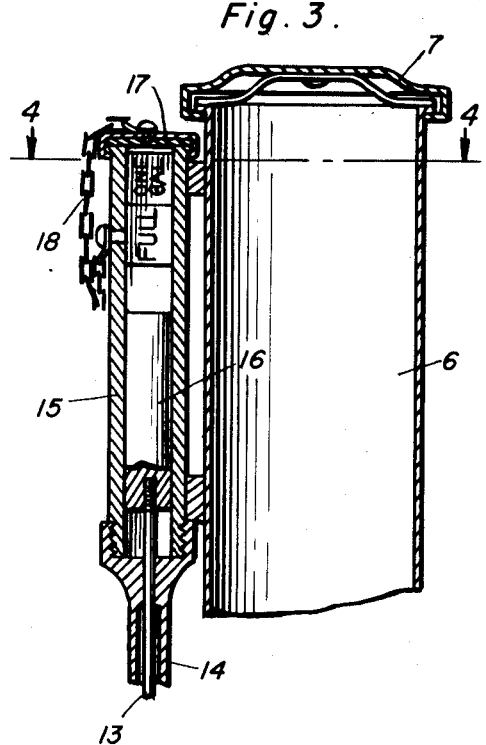
Figure 3 is an enlarged vertical sectional view of the upper end of the neck of a gasoline tank and showing one form of the invention attached thereto.

Referring now to the drawings in detail, and first with respect to the form of the invention illustrated in Figures 1 to 5, inclusive, the numeral 5 designates a gasoline tank of a type generally provided for use with automobiles or other motor-driven vehicles and including a filling neck 6 provided with a cap 7.

An opening 8 is formed in the top of the tank adjacent the lower end of the neck 6 and is closed by a raised cover 9 which projects upwardly above the upper surface of the tank to provide a chamber 10 under the cover.

A float 11 is positioned in the chamber 10 and is connected at one end to one of the side walls of the cover by a pivoted link 12 to provide for a vertical movement of the float while maintained in a substantially horizontal position.

To the other end of the float 11 is pivotally attached to the lower end of a flexible wire rod 13 which is slidably mounted in a housing 14 extending upwardly along the outside of the neck 6.

The upper end of the housing 14 is connected to the lower end of a cylinder 15 suitably secured to the side of the neck 6 adjacent its upper end. The upper end of the wire rod 13 extends into the cylinder 15 and is attached to the lower end of a plunger 16 having free vertical movement in the cylinder.

The top of the cylinder 15 is closed by a removable cap 17 attached to the cylinder by means of a chain 18 to prevent loss of the cap when removed therefrom.

The upper end of the plunger 16 is preferably flattened, as shown at 19, and provided with graduations 20 to function as an indicator element when projected upwardly above the upper edge of the cylinder. Graduations 20 preferably include a "one gallon" mark 21 adjacent the upper end of the plunger and a "full" mark 22 at a predetermined point below the mark 21.

In the operation of the device, the upper edge of the plunger 16 occupies a position below the upper edge of the cylinder 15 so that the cylinder may be closed by the cap 17. When the tank 5 is being filled with gasoline, the cap 17 is removed and when the level of the liquid approaches its capacity, the float 11 rises in the chamber 10, which thereby forces the rod 13 and plunger 16 upwardly to project the upper end of the plunger above the cylinder.

The one gallon mark 21 of the indicator is arranged to project above the cylinder 15 when the tank is filled to approximately one gallon of its capacity to thus warn the attendant that the tank is nearly full and the "full" mark 22 is exposed above the upper edge of the cylinder 15 when the tank is filled to capacity.

The plunger 16 may be forced downwardly in the cylinder to permit closing of the cap 17 when the tank is full.

Figure 6:
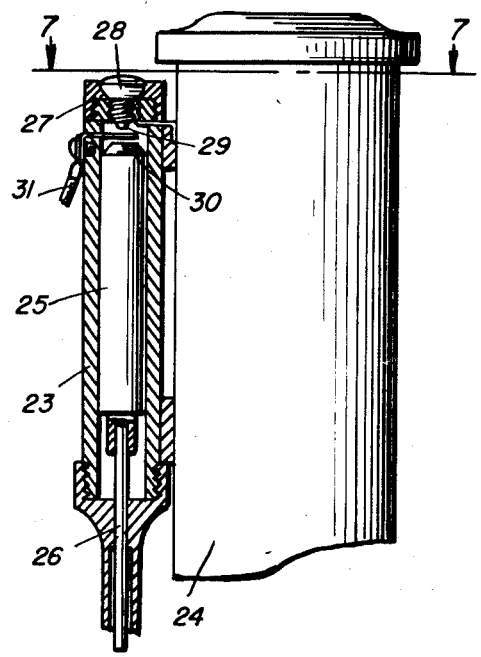
Figure 6 is a vertical sectional view of a modified form of the invention illustrating an illuminated indicator.
Figure 4:
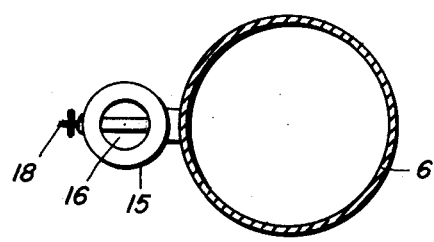
Figure 4 is a transverse sectional view taken on a line 4—4 of Figure 3.
Figure 7:
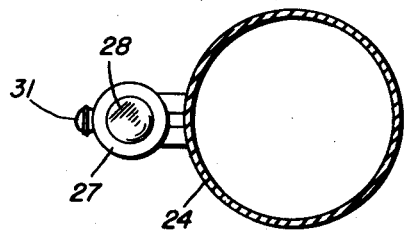
Figure 7 is a sectional view taken on a line 7—7 of Figure 6.

In the form of the invention illustrated in Figures 6 to 8, inclusive, the cylinder is shown at 23 which is attached to the filler neck 24 and mounted for vertical movement in the cylinder is a plunger 25, to the lower end of which is attached the flexible wire rod 26 leading to the float mounted in the tank.

A cap 27 is secured on the upper end of the cylinder and in which is recessed a lamp 28 having its base 29 spaced above a movable contact 30 which projects transversely of the cylinder in its upper portion and is connected to a source of power, such as the battery of an automobile, by a wire 31.

As the filling of the tank reaches its capacity, the plunger 25 rises in the cylinder to engage the contact 30 and move the same into circuit-closing position with the base 29 of the lamp to thus energize the lamp and warn the attendant that the tank is full.

Figures 9 to 10, inclusive, illustrate a further modification and in which the tank 32 is provided with a filler neck 33 and a raised chamber 34 in its top. A float 35 is positioned in the chamber with a pivoted link 36 connecting the front end of the float to the chamber and a pivoted link 37 extends from the rear of the float into a cylinder 38 for attaching to a plunger 39 slidable in the cylinder. A rod 40 projects from the rear end of plunger 39 and a resilient contact arm 41 is positioned in the path of rearward movement of the rod to close a circuit 42 for a signal lamp 43 mounted on the neck adjacent its filling end. The contact 41 is enclosed in a switch housing 44 at one end of the float chamber 34.

The switch arm 41 is closed to energize the lamp 43 upon an upward movement of the float when the tank is filled to capacity.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claims.

Having described the invention, what is claimed as new is:

1. In an overflow indicator, the combination of a tank having a filler neck a chamber offset from the tank above the liquid level of the capacity of the tank, a vertically movable float flexibly suspended from the chamber and disposed movably in the tank, an indicator carried by the neck, and an operative connection between the float and the indicator, said indicator comprising an electric lamp, a vertically movable switch for the lamp, and means for closing the switch and actuated by the float.

2. In an overflow indicator, the combination of a tank having a filler neck and a chamber in its top in communication with the tank, a float in the chamber, a switch housing on the outside of the chamber, a switch in the housing, and a rod slidably mounted in a wall of the chamber and operatively connected to the float, said rod projecting into the housing for closing the switch upon a predetermined raising movement of the float.

3. In an overflow indicator, the combination of a tank having a filler neck, a chamber offset from the tank above the liquid level of the capacity of the tank and communicated therewith, a float positioned with a portion thereof in said chamber and pivotally mounted at one end for pivoting movement into and out of said chamber, a connecting rod pivotally connected to said float remote from said pivotally mounted end for movement therewith in response to a rise in the fluid level of the tank, and an indicator operatively connected to the float by means of said rod, said indicator including a vertically movable gauge reciprocably supported by and exteriorly of the neck at its upper end, said rod having its upper end connected to said gauge for reciprocating movement.

4. In an overflow indicator, the combination of a tank having a filler neck, a chamber in the top of the tank above the liquid level of the capacity of the tank, a float positioned with a portion thereof in said chamber and pivotally connected at one end to said chamber for pivoting movement into and out of said chamber, a connecting rod pivotally connected to the free end of said float for movement therewith in response to a rise in the fluid level of the tank, the major portion of said rod being reciprocably mounted in a housing juxtaposed to said neck, and an indicator having an indicator element operatively connected to the upper end of said rod for reciprocation therewith.

LAWRENCE W. MONROE.

REFERENCES CITED

The following references are of record in the file of this patent:

UNITED STATES PATENTS

| Number | Name | Date |
|---|---|---|
| 370,838 | Williams | Oct. 4, 1887 |
| 523,158 | Welch | July 17, 1894 |
| 1,274,316 | Otto | July 30, 1918 |
| 1,391,146 | Tibbetts | Sept. 20, 1921 |
| 1,432,385 | Conners | Oct. 17, 1922 |
| 1,458,663 | Morley | June 12, 1923 |
| 1,497,550 | Coyne | June 10, 1924 |
| 1,563,560 | Friedhoff | Dec. 1, 1925 |
| 1,953,669 | Bettes | Apr. 3, 1934 |
| 2,107,952 | McGee | Feb. 8, 1938 |
| 2,240,669 | Russo | May 6, 1941 |
| 2,472,665 | Ladner | June 7, 1949 |

FOREIGN PATENTS

| Number | Country | Date |
|---|---|---|
| 12,051 | Great Britain | of 1848 |